(12) United States Patent
Clark et al.

(10) Patent No.: US 6,971,108 B1
(45) Date of Patent: Nov. 29, 2005

(54) COMPUTER SOFTWARE FRAMEWORK AND METHOD FOR MANAGING COMMUNICATION FLOW BETWEEN A USER INTERFACE AND A COMPUTER APPLICATION

(75) Inventors: Katrinka Clark, McKinney, TX (US); Wes Enochs, Richardson, TX (US); Toni Perrien, Chicago, IL (US); Connie Xu, Irving, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 851 days.

(21) Appl. No.: 09/671,981

(22) Filed: Sep. 28, 2000

(51) Int. Cl.[7] ............................................. G06F 9/46
(52) U.S. Cl. ........................ 719/316; 719/313; 719/328
(58) Field of Search .............................. 709/328, 316, 709/313

(56) References Cited

U.S. PATENT DOCUMENTS

| | | | |
|---|---|---|---|
| 5,535,389 A | * | 7/1996 | Elder et al. ................ 717/170 |
| 5,911,776 A | * | 6/1999 | Guck .......................... 709/217 |
| 6,012,098 A | * | 1/2000 | Bayeh et al. ............... 709/246 |
| 6,621,505 B1 | * | 9/2003 | Beauchamp et al. ........ 345/764 |

* cited by examiner

Primary Examiner—Meng-Al T. An
Assistant Examiner—Li Zhen

(57) ABSTRACT

The present invention discloses a computer software framework and method for managing communication flow between a user interface and a computer application performing a task comprising a plurality of steps. The sequence of the steps is controlled by the application, and a user operating the user interface controls the progression through the steps. Each step is mapped to an output file containing information to be sent to the user interface in support of the step. Each task is mapped to an output generator that generates an output sent via an output medium to the user interface based upon the content of the output file. A task object is instantiated, which models the task. The task object receives a progressional input from the user interface and receives a step sequence input from the application. The task object compares the progressional input to the step sequence input to identify a subsequent step, identifies the output file mapped to the subsequent step, and calls the output generator mapped to the task to generate an output to the user interface based upon the content of the output file mapped to the subsequent step.

19 Claims, 3 Drawing Sheets

TaskServlet
(FROM SERVLET)

- ◆ buildSubstitutionParameters(session: HttpSession): Hashtable
- ◆ createScreenMap(): Hashtable
- ◆ createTask(session: HttpSession): Task
- ◆ documentRoot(): String
- ◆ doGet(req: HttpServletRequest, res: HttpServletResponse): void
- ◆ doPost(req: javax.servlet.http.HttpServletRequest, res: javax.servlt.http.HttpServletResponse): void
- ◆ errorPageName(): String
- ◇ generateDefaultErrorPage(req: HttpServletRequest, res: HttpServletResponse, message: String): void
- ◇ generateErrorMessage(e: Throwable.util: TaskUtility): String
- ◇ generateErrorPage(req: HttpServletRequest, res: HttpServletResponse, message: String): void
- ◇ generateScreen(response: HttpServletResponse, aSession: HttpSession, taskUtil: TaskUtility, aTaskContext: Object): void
- ◇ generateValidationErrorPage(req: HttpServletRequest, res: HttpServletResponse, ve: ValidationException): void
- ◆ getProperties(): Properties
- ◆ getProperties(prefix: String): Properties
- ◆ logger(): Log
- ◇ lookupScreenMap(aUtil: TaskUtility): Hashtable
- ◇ lookupScreenMap(session: HttpSession, task: Task): Hashtable
- ◇ lookupTask(aUtil: TaskUtility): Task
- ◆ lookupTaskName(): String
- ◇ lookupTaskUtility(session: HttpSession): TaskUtility
- ◆ redirectRequest(session: HttpSession, res: HttpServletResponse): void
- ◆ redirectRequest(session: HttpSession, res: HttpServletResponse, url: String): void
- ◆ redirectServletName(session: HttpSession): String
- ◆ reset(session: HttpSession): void
- ◆ reset(session: HttpSession, res: HttpServletResponse): void
- ◇ retrieveFormParameters(request: HttpServletRequest, utility: TaskUtility): Hashtable
- ◆ servletRoot(): String
- ◆ taskContext(session: HttpSession): Object
- ◆ validationErrorPageName(): String

*FIG. 2B*

COMPUTER SOFTWARE FRAMEWORK AND METHOD FOR MANAGING COMMUNICATION FLOW BETWEEN A USER INTERFACE AND A COMPUTER APPLICATION

BACKGROUND OF THE INVENTION

The present invention is a computer software framework and method for managing communication flow between a user interface and a computer application performing a task comprising a plurality of steps. More specifically, the framework and method abstract the communication between the application and a user interface on a step-wise basis, thereby coupling each step with specific input from and output to the user interface.

Computer applications exist that perform a business process (i.e., task), which usually can be broken into individual components (i.e., steps). These applications often contain logic that controls the sequence in which the steps are carried out. Furthermore, these applications, which may reside locally or on a network server, frequently communicate with a user through a user interface such as a terminal or workstation. The user provides information or directions (i.e., a progression input) to the application, and the application provides output to the user interface, for example pages or text to be displayed on a screen. In order to ensure continuity in executing the task, it is important that progression input is received by and output is sent to the user interface in the logical sequence associated with the steps of the task being carried out by the business application. The method and framework of the present invention manages communication flow between the user interface and the computer application performing the task comprising a plurality of steps. More specifically, the framework abstracts the communication functions from the business process functions. In other words, the framework encapsulates the process for communication of information to and from a user interface separate and apart from the underlying business process (i.e., task and associated steps) being carried out by an application, thus creating a set of uniform APIs such that the presentation functions can be reused to link a variety of different applications and/or tasks with a variety of different user interfaces (e.g., a web browser, an interactive voice response (IVR) console, etc.). The result is easier navigation within the application for the user, improved continuity in execution of the application, code reusability, and availability of a consistent set of application programming interfaces (APIs) to application developers regardless of the computer application, task, steps or user interface.

SUMMARY OF THE INVENTION

The present invention discloses a method for managing communication flow between a user interface and a computer application performing a task comprising a plurality of steps, the sequence of the steps controlled by the application and the progression through the steps controlled by a user operating the user interface, comprising (a) mapping each step to an output file containing information to be sent to the user interface in support of the step; (b) mapping each task to a output generator that generates an output sent via an output medium to the user interface based upon the content of the output file; and (c) instantiating a task object modeling the task, the task object receiving a progressional input from the user interface and receiving a step sequence input from the application, the task object further performing the steps of (i) comparing the progressional input to the step sequence input to identify a subsequent step, (ii) identifying the output file mapped to the subsequent step, and (iii) calling the output generator mapped to the task to generate an output to the user interface based upon the content of the output file mapped to the subsequent step.

The present invention further discloses a framework for managing communication flow between a user interface and a computer application performing a task comprising a plurality of steps, the sequence of the steps controlled by the application and the progression through the steps controlled by a user operating the user interface, comprising: (a) an initialization file mapping each step to an output file containing information to be sent to the user interface in support of the step and mapping each task to a output generator that generates an output sent via an output medium to the user interface based upon the content of the output file; and (b) a task object modeling the task, the task object receiving a progressional input from the user interface and receiving a step sequence input from the application, the task object further comprising methods to perform the steps of (i) comparing the progressional input to the step sequence input to identify a subsequent step, (ii) identifying the output file mapped to the subsequent step, and (iii) calling the output generator mapped to the task to generate an output to the user interface based upon the content of the output file mapped to the subsequent step.

DETAILED DESCRIPTION OF THE INVENTION

Figure 1:
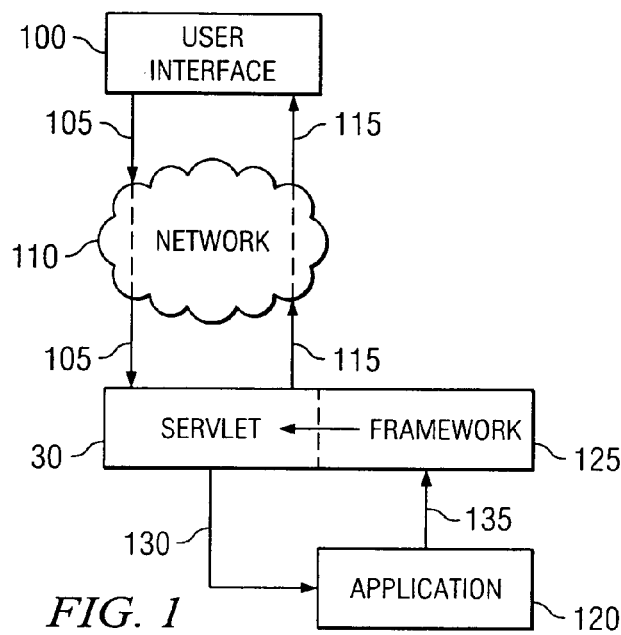
FIG. 1 is a block diagram of the present invention.

The current invention assists a user, communicating through a user interface, with performing a business related task executed on a computer application operating on a computer system. Referring to FIG. 1, user interface 100 (i.e., a workstation) is connected to application 120 via network 110. The network connection can be any suitable type of network connection, for example an internet session, wherein user interface 100 comprises a web browser accessing a web server, which in turn is linked to an application server hosting application 120. Upon establishing the internet connection between the user interface and the application, the user can provide input 105 to the application. For example, a user might need to perform a business task such as updating a client's account information using an account manager application and database residing on a backend server. The user could identify the task and application by sending the corresponding uniform resource locator (URL) as input 105.

The task the user seeks to perform may comprise a number of individual steps, each of which may require additional input 105 to application 120 (via framework 125) from the user interface. For example, in order to update an account, the first step might be to determine whether this is a new or existing account, and thus the user may have to enter this information, if known. If unknown, a preliminary database search step may have to be executed to determine if an account exists. If the update is to an existing account, the next step might be to enter the account number. If the update is to a new account, the next step might be to enter the type of new account to be opened. Each of these steps, including the initial or start-up step, will require application 120 to provide output 115 to user interface 100. In other words, the application must tell the user interface what information to communicate to the user, for example what text, page, or screen to display upon the computer monitor.

The sequence of the steps to perform a task is controlled by application 120. Subsequent steps should follow in a logical, ordered sequence as necessitated by the task being performed, and the computer application typically contains the underlying logic controlling the step sequence. The user navigates through the various steps by supplying input 105 to the application (also referred to as navigational or progressional input) in response to information and prompts (i.e., output 115) communicated by the application to the user via the user interface.

The method and framework of the present invention manages communication flow between user interface 105 and application 120 performing a task comprising a plurality of steps. More specifically, framework 125 abstracts the communication (i.e., presentation) functions from the business process functions/logic. In other words, the framework encapsulates the process for communication of information from an application to a user interface separate and apart from the underlying business process (i.e., task and associated steps) being carried out by the application, thus creating a set of uniform APIs such that the presentation functions can be reused to link a variety of different applications and/or tasks with a variety of different user interfaces.

Framework 125 receives input 105 from user interface 100, which comprises a navigational input, and optionally additional task specific information (for example, a personal identification number, account number, etc.). Framework 125 queries application 120 (as represented by line 130) and receives information from application 120 (as represented by line 135) regarding the identity of the current step in the task corresponding to the navigational input from the user. Based upon the identity of the current step, framework 125 provides output 115 corresponding to the current step to user interface 100 across network 110.

Figure 2C:
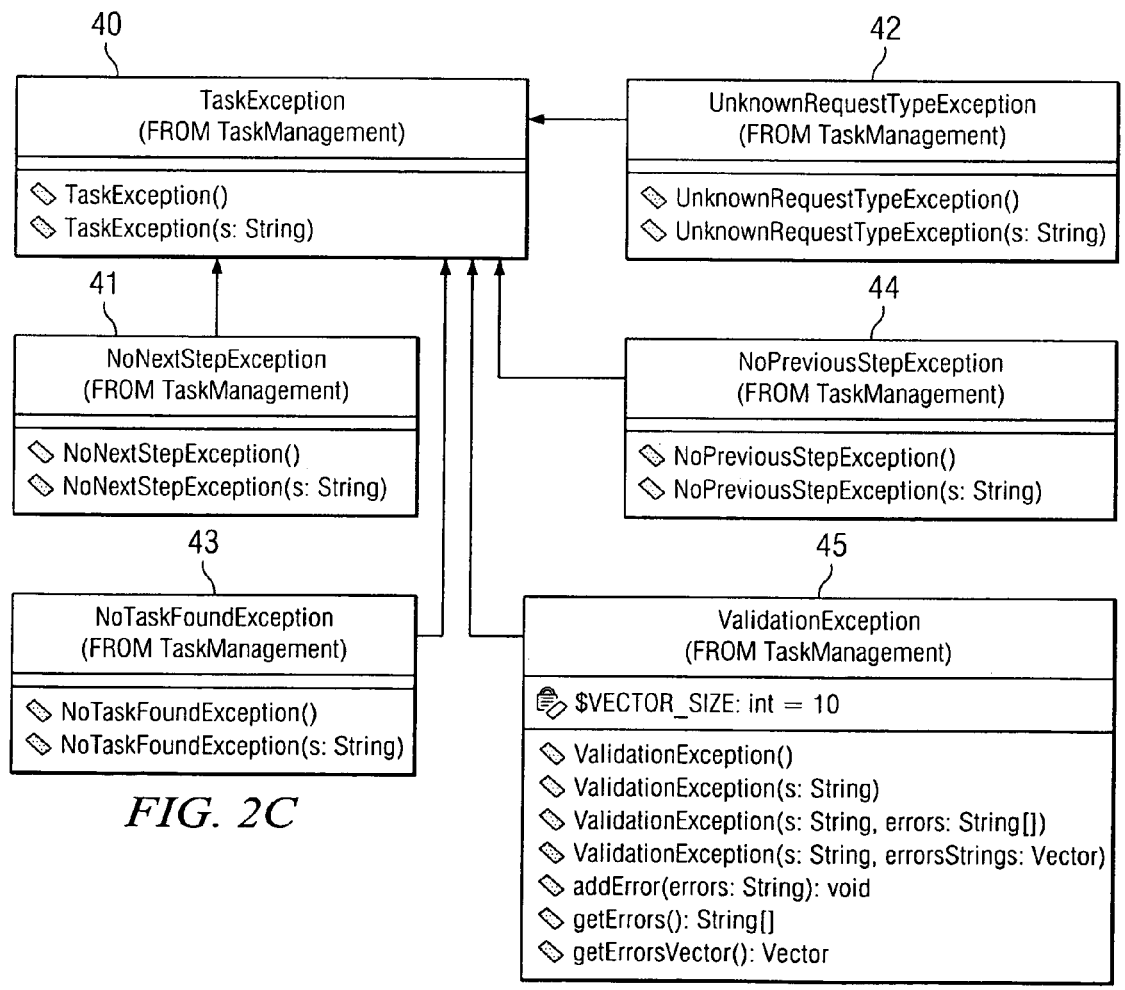
FIG. 2 is an object model, also referred to as a class diagram, of the method and framework of this invention.
Figure 2A:
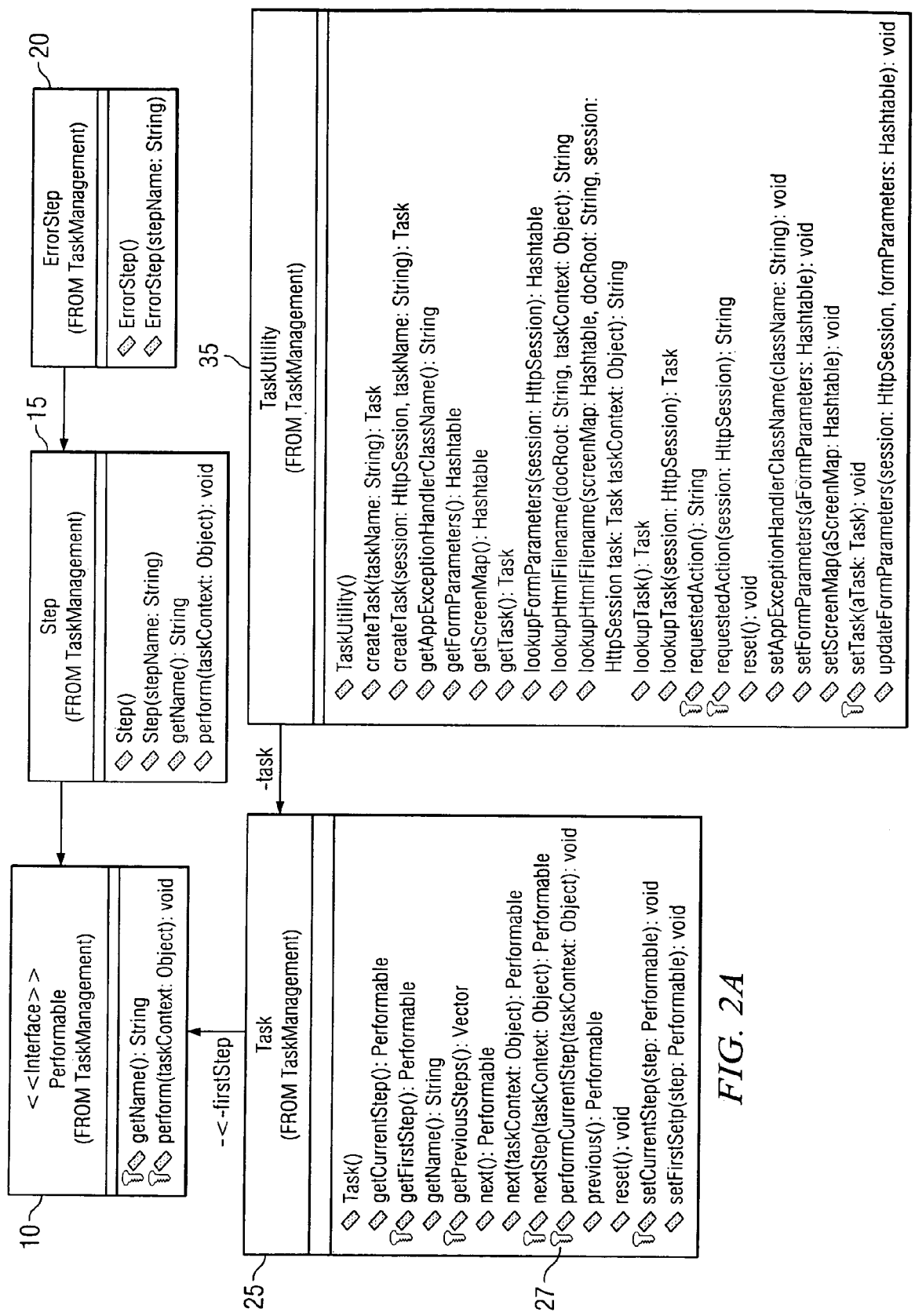

FIG. 2 shows the overall structure of the framework and the associated classes of this invention. Task servlet 30 receives input 105 from user interface 100. Preferably, input 105 is in the form of a request for an HTML page, and preferably further comprises a navigational input and optionally additional task specific information, which is passed through from the framework to the application. In a preferred embodiment, the navigational input is next step (to proceed to the next step), previous step (go back to the previous step), or cancel/reset (to exit the task). When an HTTP request is received by the task servlet 30, it includes the form parameter, RequestName, whose value is set to one of the recognized request types (i.e., next, previous, or cancel). Form parameters are defined in HTML files, and an example HTML tag might read <INPUT TYPE=submit NAME="RequestName" VALUE="Next">.

In response to the navigational input, task servlet 30 retrieves information from task utility 35 and provides the output to send to user interface 100, preferably in the form of an HTML page to display on the user's screen via a web browser. More specifically, task servlet 30 stores user requested actions (next, previous, or cancel) on task utility 35. Task utility 35 knows the current task 25 and its sequences of steps, and task 25 determines the subsequent step based on user requests (next, previous, or cancel). The application looks to an initialization (INI) file and determines from mapping what file (preferably an HTML file) corresponds to the subsequent step, which is provided to task servlet 30. Task servlet 30 serves an HTML page and sends it to user interface 100 for display on the screen.

A step is the basic component of a task, and framework 125 models the steps of a task through use of step class 15, which implements performable interface 10. The implementation of an object consists of a class definition that implements the object interface. As used in object technology, an interface (also known as a message interface) is a communication surface that determines the signals (e.g., calls) that can pass through the surface; in other words, the interface defines which calls an object will respond to. A class defines the methods and variables for a particular type of object; all objects of a given class are identical in form and behavior but contain different data in their variables. An abstract class is a class that contains one or more abstract methods (i.e., a method that has no implementation), and therefore can never be instantiated. Abstract classes contain useful information and methods and are defined so that other classes can extend them and make them concrete by implementing the abstract methods. Accessors are the methods on a class that provide access to the variables of the class (for example, get and set methods). The methods and variables comprising each class are shown in FIG. 2, and it will be understood that these methods and variables may be modified by one skilled in the art without departing from the scope of the present invention.

To create the step objects representing actual steps in a task, step class 15 may be subclassed. For example, error step class 20, which represents the step to be performed upon occurrence of an error, is a subclass that extends step class 15. The perform( ) method may be overridden to do some work associated with the task. The following is example code for creating a step named TestStep1:

```
// Create a step: TestStep1
public class TestStep1 extends com.sprint.arch.taskMgmt.Step {
    public TestStep1(String step1) {
        super(step1);
    }
    public TestStep1( ) {
        super( );
    }
    public void perform(Object taskContext) throws TaskException {
        //application code
    }
}
```

The step name should match a name defined in the initialization (INI) file. A step can be created with a user defined name or take a default name such as the fully qualified name of the class.

Task class 25 models a complete business process, and thus is comprised of a series of steps. To create a specific task object, subclass is created that extends task class 25, with steps comprising the individual components of the task. The sequence of the steps, as defined by the application, are coded into the specific task object that extends task class 25. The first step of the task typically is set during initialization. Task class 25 queries application 120 and receives information on the identity of the current step. Preferably, an abstract method, for example abstract method nextStep( ) 27, is implemented to receive information from the application that may be useful for determining the current step being performed by the application. Upon determining the current step, the task (extended from task class 25) determines the identity of the subsequent step (i.e., next step, previous step, or cancel/reset). If the user calls for the next step, the identity of the next step is determined from the coded task sequence. If the user calls for the previous step, the task utility determines the identity of the previous step from a historical path stored in a cache, which is preferably a Java object vector. If the user cancels the step or task, the application will execute a default setting, as discussed below. The following is example code for creating a task named TestTask and determining the next step:

```
// Create a task: TestTask
public class TestTask extends Task {
    public TestTask( ) {
        //Initialize to set first step
        setFirstStep("Name of first step")
    }
    protected Performable nextStep(Object taskContext) {
        Step step = null;
        String currentStepName = getCurrentStep( ).getName( );
        //determine the next step based on the current step
        if (currentStepName.equals("TestStep1")) {
            step = new TestStep2("TestStep2");
        }
        else{
            . . .
        }
        return step;
    }
}
```

An output generation component is needed to generate an output 115 sent via an output medium over network 110 to user interface 100. Prefereably, the output generation component is a Java servlet (i.e., task servlet 30) or a Java applet. A servlet is a program written in the Java programming language that extends the functionality of a web server, generating dynamic content and interacting with web clients using a request-response paradigm. An applet is a component that executes in a web browser, but can also execute in a variety of other applications or devices that support the applet programming model. Preferably the output medium is HTML pages transmitted via HTTP protocol, but other suitable output mediums and protocols may be used such as interactive voice response (IVR) communications. To create a specific servlet object, a subclass is created that extends task servlet class 30, implementing methods such as:

TaskServlet:: getProperties( )
TaskServlet:: getProperties(String)
TaskServlet:: logger( )
TaskServlet:: redirectServletName(HttpSession)

```
//Create a servlet: TestServlet
public class TestServlet extends TaskServlet {
    public Log logger( )
    {
        //create an instance of Log and use it to log message
        // Refer to the Logging framework user guide for more details.
        return null;
    }
    public String redirectServletName(HttpSession session) {
        //return the name of another URL to which this servlet should
        redirect
        return null;
    }
}
```

The sample code for task servlet includes an optional logger to log messages. The abstract logging method should be implemented by subclasses defining and returns log types. The sample code also includes a method for servlet redirection, which provides the ability to control navigation among tasks within an application. To redirect, servlets implement the abstract method, redirectServletName( ), which returns a fully qualified URL for redirection.

Task servlet class 30 defines a reset( ) method which provides a default cancel functionality in the event that navigational input received from the user is cancel/reset. This responsibility is delegated to task utility class 35, which will clear any history held in a task and clears the formParameter and screenmap attributes. The reset( ) is invoked when an HTTP request from the user contains the HTML form parameter, RequestName, set to "cancel". A preferred default setting upon cancel is that task servlet class 30 continues processing the current task beginning with its first step.

```
protected void reset(HttpSession session,HttpServletResponse res) {
    TaskUtility util = lookupTaskUtility(session);
    util.reset( );
}
```

However, this method may be overridden to enhance or modify this default behavior. For example, to perform some other task upon receiving a cancel/reset request, task servlet class 30 may define a redirectRequest( ) method upon cancel, which can invoke a new servlet by supplying the desired URL.

```
protected void reset(HttpSession session,HttpServletResponse res) {
    super.reset( )
        //Redirect to another servlet
        redirectRequest(res, "URL used in redirection");
}
```

Task servlet class 30 preferably uses a utility class, an HTML template, to generate the HTML associated with a given step that is to be displayed by the web browser. This utility will use a document root and a screenmap from the initilization file to locate an HTML file based on the identity of the given step (i.e., by mapping the step name to a file). Another HTML generation utility may be used or some custom functionality may be defined by overriding the following code:

```
public void generateScreen(HttpServletResponse response,
                           HttpSession aSession,
                           TaskUtility taskUtil,
                           Object aTaskContext) throws
                           TaskException, IOException
{
    //generateScreen( ) code
}
```

Dynamic content can be added to the HTML pages, as the HTML template class will parse a static page replacing special tags with application specific content. Dynamic content is useful in obtaining additional task specific information from the user, which is passed through to the application for processing. For example, a tag such as <SUBST KEY=subtKey> should appear in an HTML file wherever dynamic content is desired. The keyword, subtKey, is associated with a value in a hashtable returned by a buildSubstitutionParameters( ) methods on a task servlet subclass. That value will replace the <SUBST> tag once the HTML file is generated. The default implementation returns an empty hashtable.

```
protected Hashtable buildSubstitutionParameters(HttpSession session)
throws TaskException {
    return new Hashtable( );
}
```

To build a dynamic HTML page, override this method, for example by putting a servlet name as the value.

```
protected Hashtable buildSubstitutionParameters(HttpSession session)
throws TaskException {
    Hashtable temp = new Hashtable( );
    temp.put("redirectURL",
    "com.sprint.arch.taskMgmt.examples.TestServlet");
    return temp;
}
```

The framework should be initialized, for example by defining sets of key/value pairs to be used during communication management. Preferably, these keys/values pairs are initialized in a properties object upon startup. An initialization (INI) file preferably contains base servlet information defining the environment settings all servlets will need to process HTML files, locate additional servlets and respond in cases of exceptions. Preferably, the following four keys are defined:

DocumentRoot—value specifies the root directory for all static html file;

ServletRoot—the value specifies the root location for all servlets;

ErrorPageName—the value specifies the name of the html file displayed as a result of an error condition; and ValidatonErrorPageName—the value specifies the html file displayed as a result of a validation error condition.

A one-to-one mapping of a servlet to a task is another preferred entry for the properties object. As used herein one-to-one mapping of a servlet to a task means that for each servlet there is but one corresponding task. An unlimited number of mappings may be used. Furthermore, each servlet defined by the application is preferably defined in the properties object as a key. A preferred key/value pair format is: fully qualified name of task servlet class=fully qualified name of task class.

The final key/value pair defines the task to screenmap mapping. The task servlet uses a screenmap to determine which HTML file to generate based on the identity of a given step (i.e., the step name). For each task, a screenmap is preferably defined in a properties object as follows: fully qualified name of task class=screenmap. The screenmap preferably is a comma-separated list of step names mapped to HTML files in the following format: StepName1=file1.html, StepName2=file2.html, . . . . StepNameN=fileN.html. Preferably, steps are mapped to HTML files on a one-to-one basis. As used herein one-to-one mapping of a step to an HTML file means that for each step there is but one corresponding HTML file, provided however that an HTML file may be mapped to by more than one step (that is any given HTML file can be reused by any of the steps). The following example code describes how the required key/value pairs should be defined in an INI file.

```
#***********************************************************
#Base Servlet Info
DocumentRoot=d:/dsta/ServletTest/html/
ServletRoot=http://localhost:8080/servlet/
ErrorPageName=ErrorPage.htm
ValidationErrorPageName=ErrorPageName.htm
#Servlet to Task Mapping
com.sprint.arch.taskMgmt.examples.TestServlet=
com.sprint.arch.taskMgmt.examples.TestTask
#ScreenMap
com.sprint.arch.taskMgmt.examples.TestTask = TestStep 1 =
SecondPage.htm,\
                    TestStep2 = ThirdPage.htm,\
                    TestStepFinal = FinalPage.htm
```

The framework also include exception handling to catch and handle all system or application errors and exceptions, as shown by task exception class 40 and exception subclasses 41, 42, 43, 44, and 45. The setAppExceptionHandlerClassName( ) method on task utility takes the name of the application class defined to provide custom exception handling.

```
public final void setAppExceptionHandlerClassName(String className)
throws IllegalArgumentException {
    //method code
}
```

The application defined exception handler class implements the ApplicationExceptionHandler interface. The string returned from handles will be the error message displayed on the error page generated by the task servlet.

```
public interface ApplicationExceptionHandler {
    public String handle(Throwable e, Log log) throws Throwable;
}
```

The present invention may be deployed at any architectural level within an enterprise wide computing system requiring communication flow management capabilities. In a preferred embodiment the method and framework of the present invention are deployed on an application server, which may be any of a number of commercially available computer servers appropriate for accessing backend systems (e.g., databases, mainframes, customer premises equipment, and the like) to serve the needs of a client or group of clients (e.g., a user station, another server, etc.). A preferred application server is a WebLogic server available from BEA Systems Inc.

While the code examples shown herein are written in the Java programming language, which is available from Sun Microsystems Inc., it is understood that other suitable programming languages may be used as will be readily apparent to one skilled in the art. Furthermore, it should be understood that the code examples are in skeleton or outline form, and are not necessarily intended to be in complete executable form, provided however that one skilled in the art could easily tailor executable code based upon these examples. The italicized text following the double backslashes (i.e., "//") is commentary text.

What is claimed is:

1. A method for managing communication flow between a user interface and a computer application performing a task comprising a plurality of steps, the sequence of the steps controlled by the application and the progression through the steps controlled by a user operating the user interface, comprising:
   (a) mapping each step to an output file containing information to be sent to the user interface in support of the step;
   (b) mapping each task to an output generator that generates an output sent via an output medium to the user interface based upon the content of the output file; and
   (c) instantiating a task object modeling the task, the task object receiving a progressional input from the user interface and receiving a step sequence input from the application, the task object further performing the steps of:
      (i) comparing the progressional input to the step sequence input to identify a subsequent step,
      (ii) identifying the output file mapped to the subsequent step, and
      (iii) calling the output generator mapped to the task to generate an output to the user interface based upon the content of the output file mapped to the subsequent step, wherein the method is implemented in middleware and encapsulates the communication flow between the user interface and the computer application separate and apart from the task comprising a plurality of steps, thereby creating a set of uniform application programming interfaces such that presentation functions can be reused to link a variety of different applications, tasks, or both with a variety of different user interface.

2. The method of claim 1 wherein each step is mapped to an output file on a one to one basis.

3. The method of claim 2 wherein each task is mapped to an output generator on a one to one basis.

4. The method of claim 3 wherein the output generator is a Java servlet generating a hypertext markup language (HTML) output.

5. The method of claim 3 wherein the output generator is a Java applet generating a hypertext markup language (HTML) output.

6. The method of claim 4 wherein the HTML output is generated from static HTML files having dynamic content inserted therein by an HTML template.

7. The method of claim 4 wherein the output medium is hypertext transport protocol (HTTP).

8. The method of claim 3 wherein the output medium is an interactive voice response (IVR) protocol.

9. The method of claim 4 wherein each step is mapped to an output file using a screen map.

10. The method of claim 1 wherein the task object models the task through a subclass of step objects, each step object representing a step within the task and having a method to perform the step.

11. The method of claim 6 wherein the progressional input comprises an instruction to proceed to the next step, go back to the previous step, or cancel the step.

12. The method of claim 7 wherein the step sequence input from the application is received by implementing an abstract method that passes step sequence information from the application to the task object.

13. The method of claim 8 wherein step (c)(i) is performed by a utility object.

14. The method of claim 9 wherein the output generator that generates an output further comprises a method to generate an error message as an output to the user interface.

15. The method of claim 14 wherein the method to generate an error message further comprises extending an exception handling class.

16. The method of claim 1 wherein the sequence of the steps controlled by the application is obtained by the application from an external source.

17. The method of claim 16 wherein the external source is an initialization file.

18. The method of claim 16 wherein the external source is a database.

19. A framework for managing communication flow between a user interface and a computer application performing a task comprising a plurality of steps, the sequence of the steps controlled by the application and the progression through the steps controlled by a user operating the user interface, comprising:
   (a) an initialization file mapping each step to an output file containing information to be sent to the user interface in support of the step and mapping each task to an output generator that generates an output sent via an output medium to the user interface based upon the content of the output file; and
   (b) a task object modeling the task, the task object receiving a progressional input from the user interface and receiving a step sequence input from the application, the task object further comprising methods to perform the steps of:
      (i) comparing the progressional input to the step sequence input to identify a subsequent step,
      (ii) identifying the output file mapped to the subsequent step, and
      (iii) calling the output generator mapped to the task to generate an output to the user interface based upon the content of the output file mapped to the subsequent step, wherein the framework is implemented in middleware and encapsulates the communication flow between the user interface and the computer application separate and apart from the task comprising a plurality of steps, thereby creating a set of uniform application programming interfaces such that presentation functions can be reused to link a variety of different applications, tasks, or both with a variety of different user interfaces.

* * * * *